US008798377B2

(12) United States Patent
Sanjuan et al.

(10) Patent No.: US 8,798,377 B2
(45) Date of Patent: Aug. 5, 2014

(54) EFFICIENT SCALE-SPACE EXTRACTION AND DESCRIPTION OF INTEREST POINTS

(75) Inventors: David Marimon Sanjuan, Madrid (ES); Arturo Bonnin Llofriu, Madrid (ES); Tomasz Adamek, Madrid (ES); Roger Gimeno Hernandez, Madrid (ES)

(73) Assignee: Telefonica, S.A., Madrid (ES)

( * ) Notice: Subject to any disclaimer, the term of this patent is extended or adjusted under 35 U.S.C. 154(b) by 697 days.

(21) Appl. No.: 12/873,595

(22) Filed: Sep. 1, 2010

(65) Prior Publication Data
US 2011/0194772 A1 Aug. 11, 2011

Related U.S. Application Data

(60) Provisional application No. 61/302,290, filed on Feb. 8, 2010.

(51) Int. Cl.
*G06K 9/56* (2006.01)

(52) U.S. Cl.
USPC .............................. 382/205; 382/190; 382/201

(58) Field of Classification Search
None
See application file for complete search history.

(56) References Cited

U.S. PATENT DOCUMENTS

| 6,711,293 | B1 | 3/2004 | Lowe | |
|---|---|---|---|---|
| 2009/0041340 | A1* | 2/2009 | Suzuki et al. | 382/159 |
| 2009/0238460 | A1* | 9/2009 | Funayama et al. | 382/181 |
| 2009/0324087 | A1* | 12/2009 | Kletter | 382/195 |

FOREIGN PATENT DOCUMENTS

EP 1 850 270 10/2007

OTHER PUBLICATIONS

International Search Report and Written Opinion of the International Searching Authority, dated Jan. 25, 2012, for International Application No. PCT/EP2011/051704.
Herbert Bay, et. al., "Speeded-up Robust Features (SURF)", Computer Vision and Image Understanding, vol. 110, No. 3, Jun. 1, 2008, XP022652944.
William T. Scherer, et. al., "The triangular density to approximate the normal density: decision rules-of-thumb", Reliability Engineering & System Safety, vol. 82, No. 3, Dec. 1, 2003, XP055015448.
Bart M. ter Haar Romeny: "Front End Vision and Multi-Scale Image Analysis", Jan. 1, 2003, XP002666370.
Josef Bigun: "Vision with Direction", Jan. 1, 2006, XP002666371.
Bart M. ter Haar Romeny: "Front End Vision and Multi-Scale Image Analysis", Jan. 1, 2003, XP002666372.
P.S. Heckbert, "Filtering by repeated integration", Computer Graphics, vol. 20, No. 4, Aug. 1, 1986, XP002289382.
David G. Lowe, "Distinctive Image Features from Scale-Invariant Keypoints", International Journal of Computer Vision, vol. 60, No. 2, Nov. 1, 2004, XP019216426.

(Continued)

*Primary Examiner* — Jason M Repko
*Assistant Examiner* — Jhere Rowland
(74) *Attorney, Agent, or Firm* — Katten Muchin Rosenman LLP

(57) ABSTRACT

Method, system and computer program for efficiently extracting and describing scale-space interest points. It is designed towards low overall computational complexity. On one hand, the data acquired during extraction in the description phase is intensively re-used. On the other hand, an algorithmic optimization of the description that dramatically speeds up the process, is proposed.

First, the image is filtered with triangle kernel at different scales. The triangle filtered images are reused for extraction of the keypoints dominant orientation and the computation of the DAISY-like descriptor.

20 Claims, 9 Drawing Sheets

(56) References Cited

OTHER PUBLICATIONS

"Chapter 7, Interest Point Detection and Region Descriptors", In: Marco Treiber: "An introduction to Object Recognition", Jan. 1, 2010, XP002666373.

Simon A. J. Winder, et. al., Learning Local Image Descriptors, IEEE Conference on Computer Vision and Pattern Recognition, Jun. 1, 2007, XP031114228.

Engin Tola, et. al., "A Fast Local Descriptor for Dense Matching", Computer Vision and Pattern recognition, Jun. 23, 2008, XP031297231.

David Marimon, et. al., "DARTs: Efficient scale-space extraction of DAISY keypoints", 2010 IEEE Conference on Computer Vision and Pattern recognition, Jun. 13, 2010, XP031725765.

Tinne Tuytelaars: "Local Invariant Feature Detectors: A Survey", Jan. 1, 2008, XP002666374.

Engin Tola, et al. "A Fast Local Descriptor for Dense Matching" In Proc. IEEE Conf. on Computer Vision and Pattern Recognition (CVPR), vol. 0, pp. 1-15, 2008.

Simon A.J. Winder, et al. "Learning Local Image Descriptors" In Proc. IEEE Conf. on Computer Vision and Pattern Recognition (CVPR), vol. 0, pp. 1-8, 2007.

Simon Winder, et al. "Picking the best DASIY" In Proc. IEEE Conf. on Computer Vision and Pattern Recognition (CVPR), vol. 0, pp. 178-185, IEEE Computer Society, 2009.

K. Mikolajczyk, et al. "A Comparison of Affine Region Detectors" International Journal of Computer Vision, 65 (1/2):43-72, 2005.

Chris Harris, et al. "A Combined Corner and Edge Detector" In Alvey Vision Conf., pp. 147-151, 1988.

Edward Rosten, et al. "Machine learning for high-speed corner detection" In Proc. European Conference on Computer Vision (ECCV), vol. 1, pp. 430-443, 2006.

Vincent Lepetit, et al. "Keypoint Recognition using Randomized Trees" IEEE Trans. on Pattern Analysis and Machine Intelligence, vol. 28, No. 9, pp. 1465-1479, Aug. 2006.

Krystian Mikolajczyk, et al. "A Performance Evaluation of Local Descriptors" IEEE Transactions on Pattern Analysis and Machine Intelligence, vol. 27, No. 10, pp. 1615-1630, Oct. 2005.

Matthew Brown, et al. "Invariant Features from Interest Point Groups" In Proc. British Machine Vision Conference (BMVC), pp. 656-665, Sep. 2002.

Vincent Lepetit, et al. "Monocular Model-Based 3D Tracking of Rigid Objects: A Survey" Foundations and Trends in Computer Graphics and Vision, vol. 1, No. 1, pp. 1-89, Sep. 2005.

T. Lindeberg. "Scale-Space Theory in Computer Vision" Kluwer, 1994. Abstract of the book retrieved from http://kth.diva-portal.org/smash/record.jsf?pid=diva2:440615. Book can be Retrieved from: http://books.google.com/books?id=u21OX41EbVkC&printsec=frontcover#v=onepage&q&f=false.

\* cited by examiner

EFFICIENT SCALE-SPACE EXTRACTION AND DESCRIPTION OF INTEREST POINTS

TECHNICAL FIELD

The present invention relates generally to a method and system for operating on images and more particularly to a method and system for efficiently extracting and describing scale-space interest points.

DESCRIPTION OF THE PRIOR ART

Keypoints or salient points are those samples in an image that are highly repeatable across different view conditions such as viewpoint and illumination. Identifying those keypoints in different imaged instances of an object or a scene permit to fulfill tasks like reconstructing 3D spaces or recognizing objects, among others.

In the last decade, several keypoint extraction techniques have been developed. Among them there exist two methods that have had wide acceptance across several application domains due to their robustness, namely Scale-Invariant Feature Transform Method, SIFT (used for example in U.S. Pat. No. 6,711,293 "Method and apparatus for identifying scale invariant features in an image and use of same for locating an object in an image") and Speeded Up Robust Features Method, SURF (used for example in European Patent Number 1850270 "Robust interest point detector and descriptor").

SIFT method searches for extrema on the difference of Gaussian at consecutively sampled scales. First, a pyramid of smoothed versions of the input image is computed. Extrema are found inside each octave (doubling of sigma). At each one of those extrema, a keypoint is described with information extracted from the neighboring pixels. In the case of SIFT, a descriptor is built based on the orientation of the gradient. First, a grid is defined according to the main orientation of the gradient around the keypoint. Inside each grid, a histogram of the orientation of the gradient weighted by their magnitude is computed. The descriptor is built typically with 4×4 such regions and histograms of 8 bins, leading to a vector of 128 components. This method has demonstrated good performance in a large variety of applications, such as 3D reconstruction, object recognition or robot localization. However, this method has one main drawback, namely, the computational cost of building the pyramid and determining the descriptor for each keypoint.

SURF on the other hand, is designed for much faster scale-space extraction. Extremas are located on the determinant of Hessian approximated by Haar-wavelets. The descriptor is based on the polarity of the intensity changes. Sums of the gradient (oriented with the main orientation of the keypoint) and absolute of gradient in horizontal and in vertical direction are computed. The descriptor is usually formed of 4 such values computed on 4×4 regions around the keypoint, leading to a descriptor of 64 values. The benefit of their method comes mainly in the extraction phase, where the Haar-wavelets are computed by accessing the integral image. This dramatically reduces the number of memory accesses and computations, especially in a multi-scale environment.

Recent studies (as for example S. Winder and M. Brown. *Learning local image descriptors*. In Proc. IEEE Conf. on Computer Vision and Pattern Recognition (CVPR), volume 0, pages 1-8, Los Alamitos, Calif., USA, 2007. IEEE Computer Society) have thoroughly evaluated the performance of different descriptor layouts and features, among other parameters to describe image patches. In their studies, one can observe clear improvements on specific combinations of parameters (e.g. the DAISY descriptor disclosed in E. Tola, V. Lepetit, and P. Fua. *A fast local descriptor for dense matching*. In Proc. IEEE Conf. on Computer Vision and Pattern Recognition (CVPR), volume 0, pages 1-8, Los Alamitos, Calif., USA, 2008. IEEE. Computer Society) over the widely accepted descriptors cited above. However, the full implementation of those combinations leads to computationally demanding methods.

To sum up, we propose a novel framework for fast scale-space keypoint extraction and description with the following contributions:

- An approximation of the determinant of the Hessian by piece-wise triangle filters that is both, faster and provides similar or better performance than the integral image-based approximation of SURF and the Difference-of-Gaussian of SIFT.
- A keypoint orientation assignment faster than the one in SURF.
- A DAISY-like descriptor extracted efficiently by reusing computations done for keypoint extraction and optimizing the sampling space.

All these improvements lead to a speed-up factor of 6 when compared to SIFT and 3 when compared to SURF, with better "precision-vs-recall" performances than the ones obtained by SIFT and SURF.

SUMMARY OF THE INVENTION

The present invention proposes a method, system and computer program to extract and describe keypoints in scale-space. In particular, a method, system and computer program to extract viewpoint and illumination invariant keypoints in scale-space with a particular configuration that shows better precision vs. recall results than SIFT and SURF is disclosed.

The algorithm is designed towards low overall computational complexity. On one hand, the data acquired during extraction in the description phase is intensively re-used. On the other hand, an algorithmic optimization of the description that dramatically speeds up the process, is proposed.

In a first aspect, a method for scale-space keypoints extraction and description in an image, the method comprising the following steps:

a) Filtering the image with triangle kernel filters at different scales b) Computing an approximation of the determinant of Hessian at each scale, where this approximation at each scale k, is calculated as $|\partial^k_{xx}(i, j) \cdot \partial^k_{yy}(i, j) - \partial^k_{xy}(i,j)^2|$ where $\partial_{xx}$ is the second horizontal derivative of Gaussian over the filtered image response L(k, i, j) obtained in step a) at scale k at point (i, j), $\partial_{yy}$ is the second vertical derivative of Gaussian over the filtered image response L(k, i, j), and $\partial_{xy}$ is the cross derivative of Gaussian over the filtered image response L(k, i, j), using a first design parameter $d_1$ for computing the second horizontal and vertical derivatives of Gaussian, $\partial_{xx}$ and $\partial_{yy}$, and a second design parameter $d_2$ for computing the cross derivative of Gaussian $\partial_{xy}$, being both first and second design parameters $d_1$ and $d_2$ proportional to the deviation σ of the second derivative of Gaussian kernel;

c) Searching for extremum values, both within a single scale and along the scale space, of the approximation of the determinant of Hessian obtained in step b) and calculating the keypoints from these extremum values d) For each keypoint, localised at an extremum value, detecting the dominant orientations from gradient information calculated using the filtered image response obtained in step a)

e) Calculating for each dominant orientation a keypoint descriptor.

FIG. 1 shows a block diagram of the best mode of the method. First, the image is filtered with triangle kernel at different scales. This is followed by the computation of the determinant of Hessian at each scale and then, the detection of extrema on this space. The keypoints are found using said extrema (the keypoints are selected as those pixel as a particular scale which are extrema of the determinant of Hessian) and for each keypoint, the dominant orientations are computed from gradient information extracted using the triangle-filtered images. For each dominant orientation, its descriptor is calculated. This computation uses the oriented gradients also extracted from the triangle-filtered images.

In another aspect, a system comprising means adapted to perform the above-described method is presented.

Finally, a computer program comprising computer program code means adapted to perform the above-described method is presented.

For a more complete understanding of the invention, its objects and advantages, reference may be had to the following specification and to the accompanying drawings,

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but rather as an example of how the invention can be embodied. The drawings comprise the following figures.

DETAILED DESCRIPTION OF THE INVENTION

The invention method describes a process to first detect keypoints in scale-space (keypoint extraction step) and then describe them with a DAISY-like descriptor (keypoint description step). The invention covers both processes both separately and together.

The invented method for scale-space extrema detection is composed of three steps.
1. First, a computation of the determinant of Hessian of each scale.
2. Second, extrema search in scale-space.
3. The last step is optional and it consists in finding the keypoints with sub-pixel and sub-scale.

Let us start by explaining the extraction algorithm generically and then the exact process that makes it efficient. The determinant of Hessian consists in computing $|\partial_{xx}(i,j) \cdot \partial_{yy}(i,j) - \partial_{xy}(i,j)^2|$, where $\partial_{xx}$ is the second horizontal derivative of Gaussian over an image, $\partial_{yy}$ is vertical, and $\partial_{xy}$ is cross derivatives. Our method can be used with different filter kernels. At least the extraction step can be performed with two-dimensional Gaussian filters, those filters approximated with Symmetric Weighted Integral Images and also an approximation with piece-wise triangles. Symmetric Weighted Integral Images are integral images (cumulative two-dimensional sum) that are weighted with an increasing or decreasing factor. By computing several such integrals and accessing them at different locations it is possible to reproduce a large number of kernel shapes. The method computed with piece-wise triangles is the preferred mode and explained hereafter.

Figure 1:
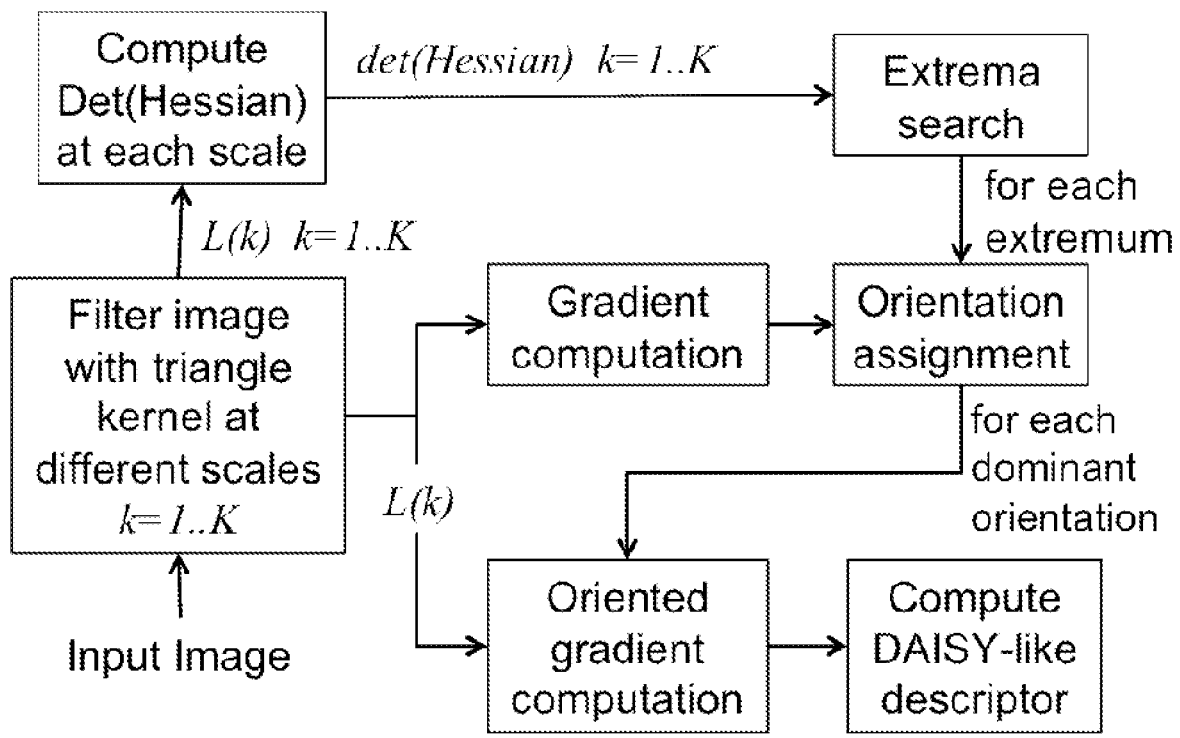
FIG. 1 represents a block diagram of the best mode of the proposed keypoint extraction and description method. The triangle filtered images are reused for extraction of the dominant orientation and the computation of the DAISY-like descriptor.
Figure 2:
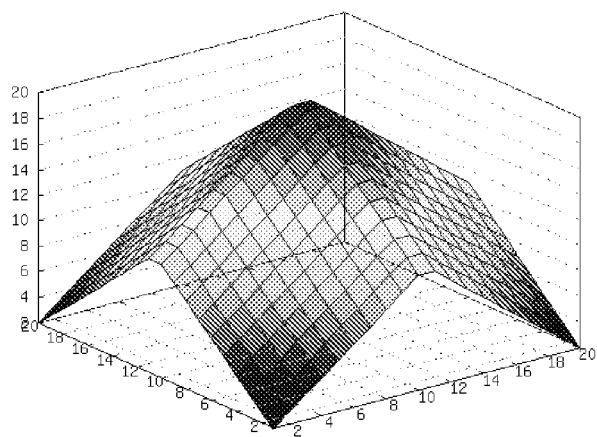
FIG. 2 shows a 2D triangle-shaped kernel.

Let us assume that an image is filtered with a 2D triangle shaped filter obtaining L(i, j). FIG. 2 plots the shape of this filter.

Figure 3:
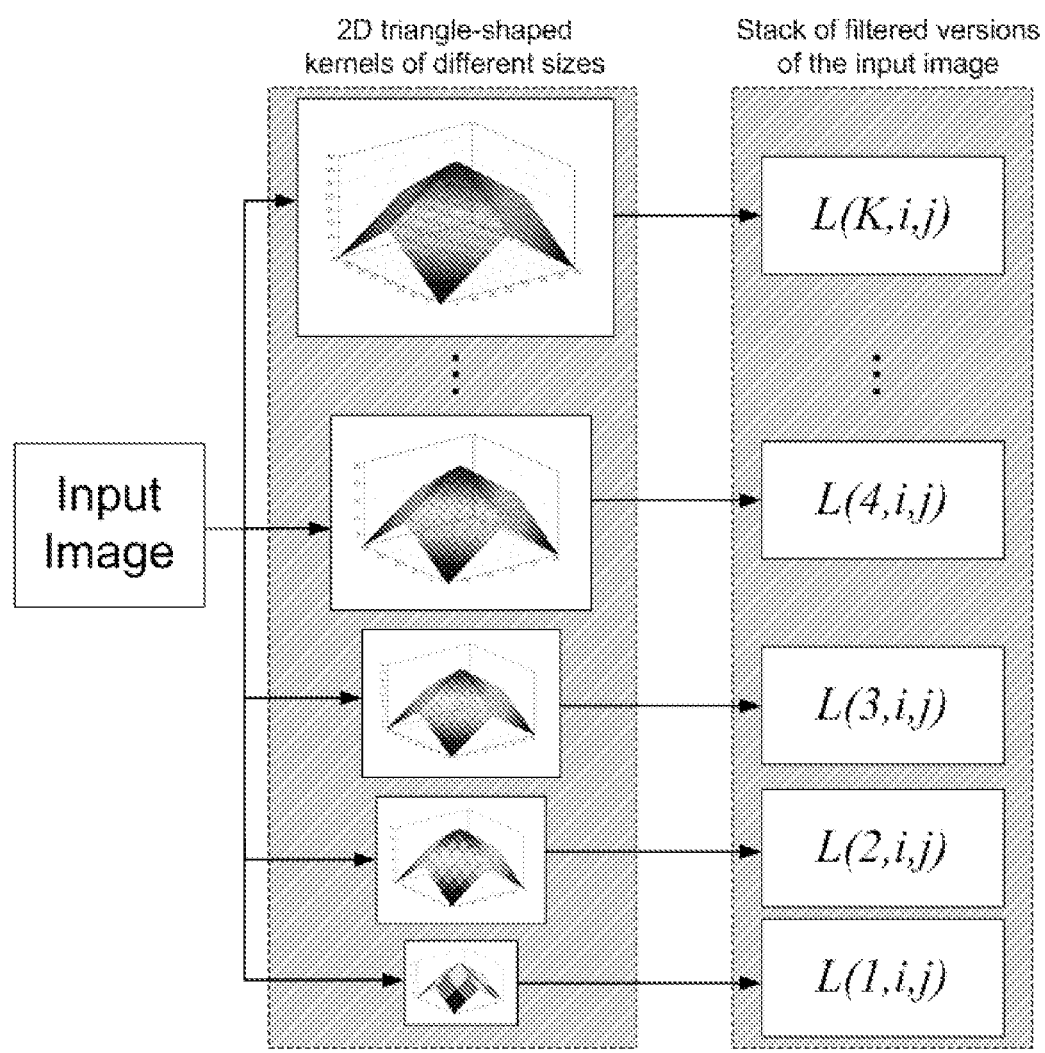
FIG. 3 shows a stack of filtered versions L(k,i,j) with k=1, ..., K created by filtering the input image with a 2D triangle-shaped kernel. At each scale the size (both horizontal and vertical axes equally) of the kernel is increased.

FIG. 3 shows the stack of filtered versions L(k,i,j) with k=1, ..., K created by filtering the input image with a 2D triangle-shaped kernel. At each scale the size (both horizontal and vertical axes equally) of the kernel is increased.

Figure 4:
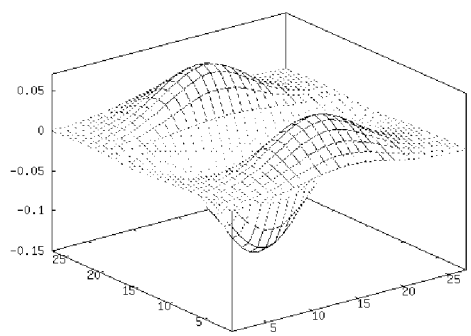
FIG. 4 shows the shape of the second derivative. Top: Gaussian. Bottom: approximation with weighted triangle filters.
Figure 4:
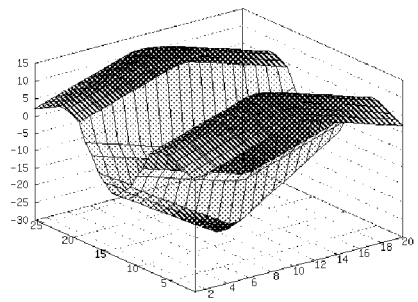

For each scale k, all the derivatives are computed by accessing the corresponding filtered response L(k,i,j) at different points (i,j). Conceptually, the shape of the second horizontal derivative of Gaussian (see FIG. 4 top) is approximated by translated and weighted triangle-shaped responses (see FIG. 4 bottom).

Figure 5:
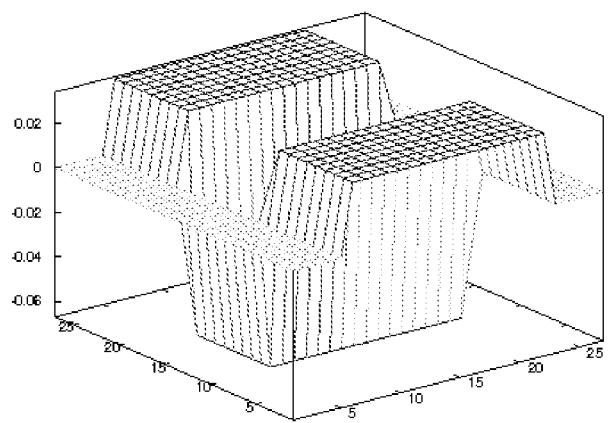
FIG. 5 shows the 2nd derivative filter shape for horizontal (or equivalently rotated vertical axis) used in SURF.

This process is performed at different scales k=1, ..., K leading to approximations
where $d_1$ and $d_2$ are chosen experimentally and proportional to the $\sigma$ (sigma) of the approximated second derivative of Gaussian kernel. Note that those approximations are not equivalent to filtering with a triangle filter and then convolving with a $2^{nd}$ derivative filter [1; −2; 1] as this would generate undesired artifacts. As it can be deduced, computing the derivatives requires only 9 accesses to L. This should be compared to the box-shaped approximation of SURF, where the computation of the determinant of Hessian requires 8+8+16=32 accesses to the integral image. An example of this approximation for the $2^{nd}$ derivative using Haar-wavelets is shown in FIG. 5.

The scale space is formed with the stack of filtered versions L(k, i, j) as shown in FIG. 3. This is different than in SIFT and SURF where a pyramid of filtered versions is created. In this process, at each octave (doubling of the sigma σ of the Gaussian or approximated Gaussian filter, respectively) sub-sampling is performed. In our experiments, sub-sampling creates a relevant loss of performance and therefore the method described in this invention performs the filtering of the input image without sub-sampling. Although this might look as computationally demanding, as described below, one of the improvements of this method is the constant re-use of the filtered versions L(k, i, j). Firstly, this enables large computational savings during the computation of the determinant of Hessian (as discussed before) and secondly, this is further exploited in the description of the keypoints as explained later.

So far we have explained how to compute the determinant of Hessian by accessing a limited number of samples of the 5 triangle-filtered versions of the input image. Because multi-scale filtering is a time-consuming process, the method performs an efficient computation of the triangle-filtered versions to further decrease the computational cost. Gaussian filters can be approximated by iteratively convolving box-type filters, a relation between the n times convolution of box filters and accessing several samples of the n times integral of a signal has been identified. Computing the triangle filtered version of a 1D signal (twice the convolution of a box filter) can be made by accessing only 3 samples of the signal at a time and then integrating twice. In the present invention, for a single scale k, L(k, i, j) is obtained on the fly with only two passes (one horizontal and one vertical) over the input image.

Figure 6:
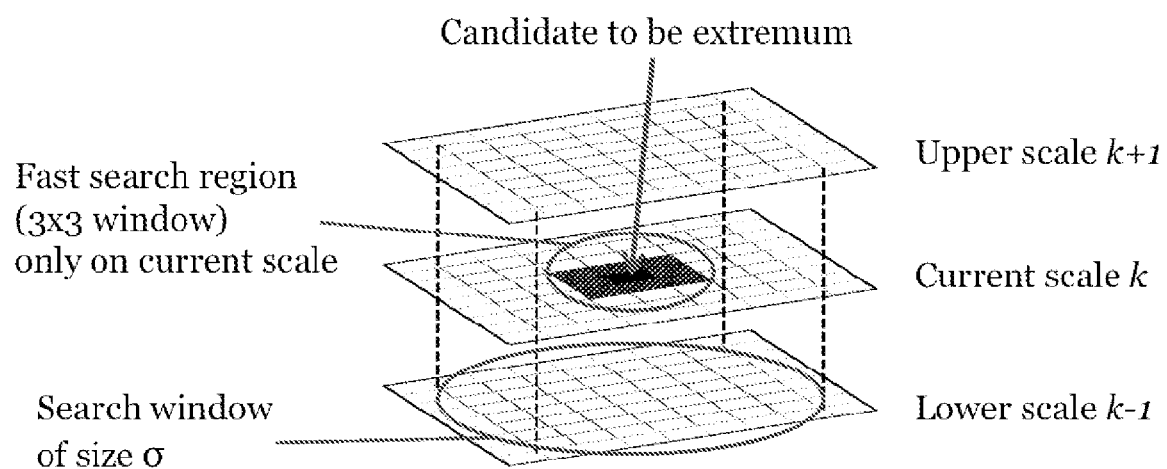
FIG. 6 shows a graphical representation of the search for extrema in current, upper and lower scales. An optional fast search is performed in a 3×3 window on the current scale.

The search for an extremum is performed on all scales except the first k=1 and the last one k=K. Extrema are searched within a search window of σ on the current k, upper k+1 and lower k−1 scales. The invention also covers an extension to speed up the process: a first test is performed on a 3×3 window on the current scale k to quickly detect non-maxima and avoid further processing. FIG. 6 depicts a graphical representation of this search.

It should be noted that both SIFT and SURF search for extremas only inside octaves of the pyramid, and generate extra scales to allow for correct extrema detection. The proposed extrema search is continuous in the scale-space stack.

The last step is optional and it consists in finding the keypoint with sub-pixel and sub-scale accuracy: The preferred mode is to obtain this accuracy as in *M. Brown and D. Lowe. Invariant features from interest point groups. In Proc. British Machine Vision Conference (BMVC), pages 656-665, September 2002).*

That is, the method fits a quadratic function centered in each extremum sample to determine the interpolated location, searching in the neighboring pixels of the same scale, the upper and the lower ones. Matching results and stability are improved using sub-pixel and sub-scale accuracy.

Some studies, have recently evaluated different features, layouts and steps to describe keypoints. The one that provides the best results is a DAISY layout similar to that depicted in FIG. 7, Motivated by those results, the invented method covers a variation of a DAISY descriptor that fits our purpose of re-using as much information as possible from the extraction step.

In order to generate viewpoint invariant descriptors, the first step is to detect the dominant orientation of the keypoint. The approach followed in SIFT is to compute the histogram of gradient orientations weighted by their magnitude within a window of the corresponding Gaussian-smoothed image. Gradients are computed by pixel differentiation. The dominant orientation is found in the peak of the histogram. If more than one dominant peak is found, several keypoints are generated. In the case of SURF, derivatives are computed with Haar-wavelets (exploiting the integral image) at sampled points in a circular neighborhood of the keypoint. The magnitude of each sample populates a space of horizontal and vertical derivatives. This space is scanned and the dominant orientation is found with the largest sum of values within the window.

The present invention exploits some of the benefits of both approaches and defines an alternative approach. For each keypoint, a reduced number of samples inside a neighborhood are accessed to compute the gradient. Speedup is gained by sampling a circular neighborhood. For each sample (i,j), our advantage is that gradients are computed by simply accessing L(k) at two points (compared to 6 samples in SURF):

$$\partial^k_x = L(k, i-d_3, j) - L(k, i+d_3, j)$$

for the horizontal first derivative and equivalently for the vertical one. $d_3$ is proportional to σ if no sub-scale accuracy is obtained or σ' otherwise. Each derivative is accumulated into a histogram with a weight proportional to its magnitude and with a Gaussian kernel centered at the keypoint. Finally, multiple dominant orientations are found by searching for peaks with values near the maximum.

In the present invention, a descriptor is composed of first-order derivatives (gradient) sampled with a specific layout, followed by a normalization over the entire vector.

The layout consists of a number of segments and rings. Each segment is a portion of the neighborhood of the keypoint. Each segment generates a number of features. Rings are a group of segments that share the following property: the centre of the segment is placed at the same Euclidean distance from the keypoint. This distance is discussed later in this document. In addition, the layout has a central segment centered at the keypoint.

Each segment contributes to the feature vector that describes de keypoint. Samples inside each segment are accessed to compute the features of that corresponding segment. The original feature sampling block consists in computing first order derivatives (gradient) from every pixel in a neighborhood of the keypoint and obtain a vector of four values: $\{|\partial_x|-\partial_x; |\partial_x|+\partial_x; |\partial_y|-\partial_y; |\partial_y|+\partial_y\}$, being $\partial_x$ the horizontal first derivative and $\partial_y$ the vertical first derivative In the present invention, the same four values are approximated and computed but only from selected samples inside a segment. At each such sample, gradients are evaluated and the derivatives are oriented according to the orientation of the keypoint. Note that SURF computes also oriented gradients but cannot exploit the integral image without introducing artifacts as Haar-wavelets are oriented with image pixel indexing. On the other hand, approximating oriented gradients is straightforward in the present invention with only two accesses to L(k)

where θ is the angle of the corresponding dominant orientation of the keypoint.

Such feature extraction is performed on samples with the spatial distribution that follows the layout of segments and rings described before.

The invention covers all the possible layouts that obtain the features from the filtered versions L regardless of the filter kernel. The preferred mode of the invention uses the layout that produces the best results while keeping the length of the descriptor relatively short. It has 8 segments and 2 rings. This produces a vector of (1+2·8)·4=68 values. Moreover, the number of samples selected for each segment varies depending on the ring. In particular, the kernels have size 3×3, 5×5, and 7×7, for the central segment, first and second rings, respectively. A Gaussian weighting is also performed on the samples of each segment. Prior to accessing the samples of each segment, the whole layout (segment centers and segment samples) is rotated with respect to dominant orientation of the keypoint.

Finally, L2-normalisation is applied on the descriptor vector. The result is quantized into only 8 bits. L2-normalisation and quantization to 8 bits are both optional and independent, but are part of the preferred mode. This vector is what we call a DART keypoint.

In the original DAISY descriptor there are two parameters that further determine the layout: the distance between samples of the sampling block of each segment and the distance between the center of the keypoint and the centers of each segment.

Figure 7:
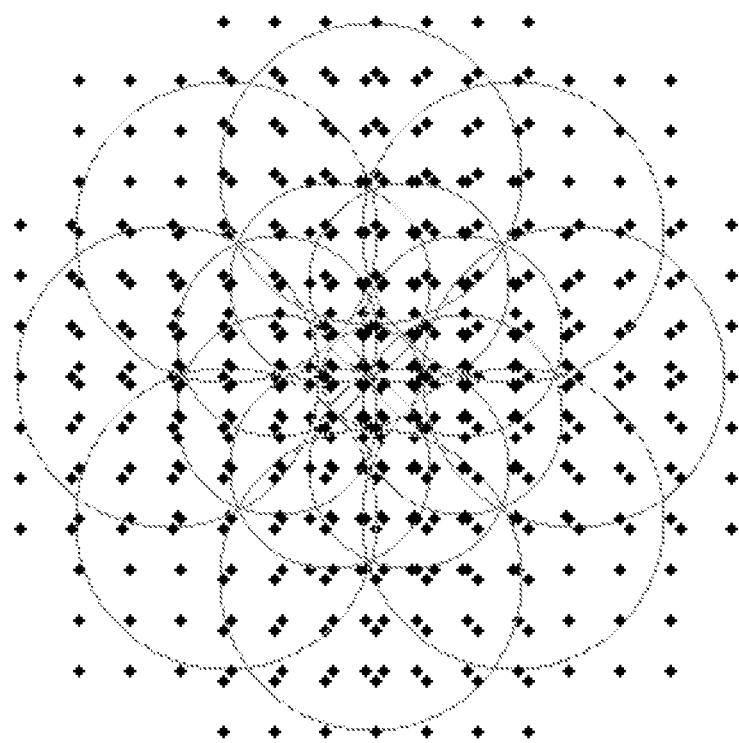
FIG. 7 shows the layout with 2 rings and 8 segments (represented with circles) per ring oriented at 0 degrees. Due to the distance of segments to the center many samples (represented with dots) are closely located.

Due to experiments results, the samples are separated by $2\sigma$, and a distance to segments of $4\sigma$ for the first ring and $8\sigma$ for the second is taken. The segments in this layout largely overlap as can be seen in FIG. 7. This property is actually desirable in our design since the descriptor computation can be optimized.

By looking at the coordinates of the samples that contribute to each segment, one can observe how very close samples (if not exactly the same) are accessed. We proceed by re-grouping near samples into a single sample. The X and Y oriented derivatives computed at that sample contribute to several segments with the corresponding weight.

The process of computing the samples that are to be accessed is performed only once independently of the scale. The scale ($\sigma$) or sub-scale ($\sigma'$) if sub-scale accuracy is applied, is a multiplicative factor applied at the moment of computing the descriptor of a given keypoint. The result is a grid of samples and the corresponding links to the segments they contribute to.

This optimization drastically reduces the number of accesses. From the original $3\times3+5\times5\times8+7\times7\times8=601$ samples (implying 2404 memory accesses to the filtered version), the number is dropped to 197 samples (788 memory accesses), by re-grouping samples located within a radius of $\sigma/2$. This reduction has no significant loss of performance as shown in the next section. Further re-grouping with a larger radius starts to impoverish the overall results. As it can be deduced, the grid approximation has less impact on keypoints at small scales where samples are even closer together.

This invention covers both the sampling with and without optimization on the number of samples.

Figure 8:
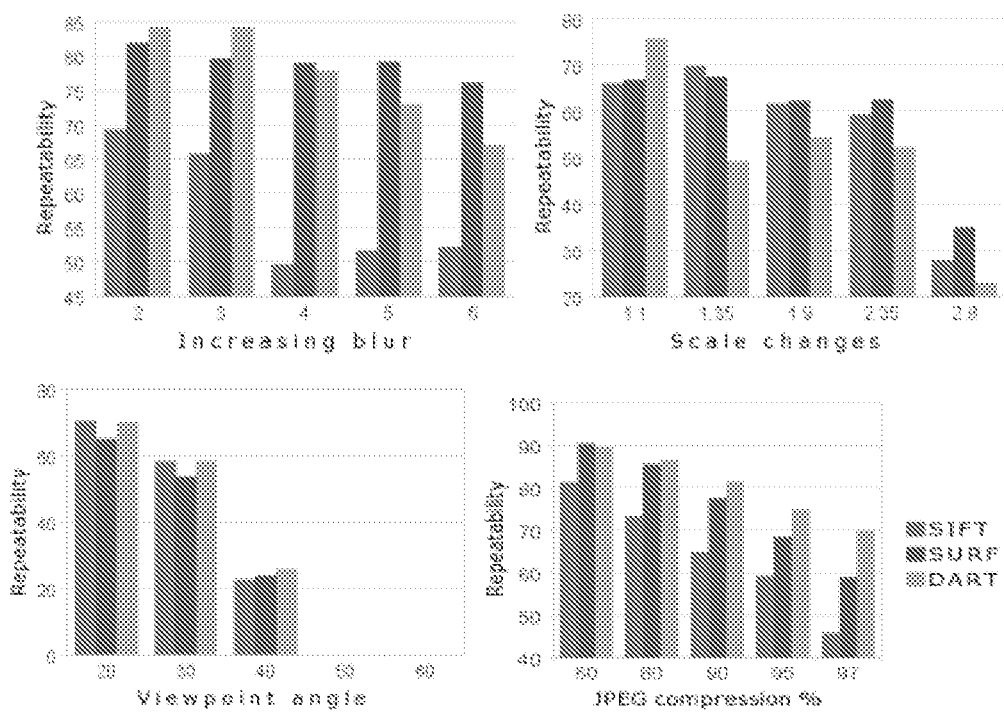
FIG. 8 shows the repeatability score (%) for image sequences. DART has similar or better performance than SIFT and SURF for viewpoint changes, blur and jpeg compression. Scale changes seem to affect DART's extraction phase more that the other techniques.

The extraction process can be validated by measuring the repeatability of keypoints across different image transformations. To simplify the understanding of the figures, the present invention has been identified using the preferred mode with the name DART. FIG. 8 shows a comparison of repeatability score for SIFT, SURF and DART in several sequences of the database. For each sequence different distortions are applied with increasing intensity (e.g. increasing blur, or JPEG compression).

For viewpoint, blur and jpeg compression, we can observe that DART has similar or better performance than SIFT and SURF. Although comparable to the other techniques, scale changes seem to affect DART's extraction phase. This behavior is attributed to the approximation of Gaussian second derivatives with triangles.

Figure 9:
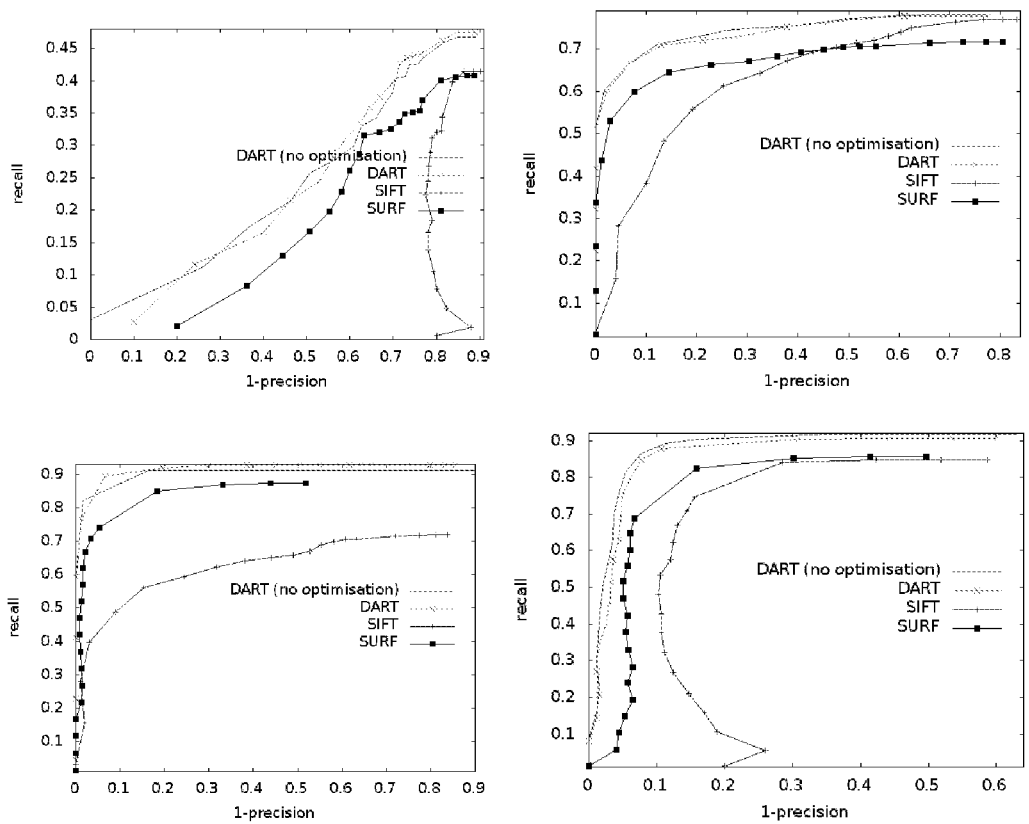
FIG. 9 shows a graphical representation of—Precision vs Recall for image sequences, from left to right and top to bottom, Graffitti, Boat, Bikes and Leuven. DART produces better results in all the evaluated sequences Corresponding numerals and symbols in the different figures refer to corresponding parts unless otherwise indicated.

The invented variation of the DAISY descriptor at keypoints detected with our extractor can be validated by measuring the 1-Precision vs. Recall. FIG. 9 depicts the performance achieved by the invented method with and without descriptor optimization, together with the performance of SIFT and SURF. As it can be seen, DART produces better results in all the evaluated sequences.

The proposed algorithm for extracting and describing keypoints is designed towards efficiency. In order to validate this hypothesis, keypoints on the first Graffiti image (image size: 800×640 pixels) have been extracted on an Intel Core 2 Duo CPU @ 2.33 GHz with 2 GB RAM. The time spent for the present method is compared to the time spent with the binaries of SIFT and SURF (from the official authors' website). Table 1 shows the time spent for each method. Note that the elapsed time includes image loading and also writing the keypoints in an ASCII file. Different thresholds have been used in DART for a fairer comparison in terms of number of keypoints

TABLE 1

Time spent for different keypoint extraction methods on the first image of the Graffitti sequence (800 × 640 pixels).

| Method | Descriptor length | Number of keypoints | Time [s] |
| --- | --- | --- | --- |
| SIFT | 128 | 3106 | 3.356 |
| DART | 68 | 3044 | 0.536 |
| SURF | 64 | 1557 | 1.207 |
| DART | 68 | 1540 | 0.394 |

Results show a speed up by a factor of 6× when compared to SIFT and 3× when compared to SURF. Although not implemented in this experiment, note the highly parallel nature of the scale stack extraction step. This indicates that further reduction of computational cost is possible.

In order to further validate the applicability of the invented method, two computer vision problems that successfully employ DART have been explored. Note that DART can be applied as well to other problems beyond the ones validated here.

Object Tracking: Three-dimensional object tracking consists in trailing the 3D pose of an object with respect to a static or moving camera. This is often used in applications such as Augmented Reality. In the particular case of planar objects, the problem can be solved by matching keypoints on a reference image of the object against the keypoints extracted at each frame of a video stream. Once the correspondences are established, the pose of the object can be estimated. We have implemented a nearest neighbor matching of DART descriptors. We eliminate those correspondences where the Euclidean distance is beyond a threshold and if the ratio between the distance to the first and second best match is not greater than 0.7.

3D Reconstruction: There is a vast variety of scene reconstruction techniques. In the present case, DART keypoints are triangulated from two or more consistent views to generate a 3D point cloud. To perform this task, Structure-from-Motion and Epipolar geometry is used to build the geometric representation of a real scene using a video sequence as input.

In short, the present invention proposed a novel method to efficiently extract and describe scale-space keypoints. The invention includes an extraction method that approximates the determinant of Hessian scale space by piece-wise triangle filters efficiently computed. The invention also includes a variation of the DAISY descriptor with an optimization over the sampling space.

The method has been compared to similar techniques in terms of repeatability, precision vs recall and also computational cost. In terms of repeatability our extractor has comparable or better performance than SIFT and SURF. In the case of precision-recall, the invented optimized descriptor layout is a clear benefit with respect to the other methods. It is also shown a reduction of the computational complexity with speedup of 6× when compared to SIFT, and 3× when compared to SURF. Together with this evaluation, the invention has been applied successfully to object recognition and 3d reconstruction applications.

The present invention proposes a method, system and computer program to extract and describe keypoints in scale-space. In particular, a method, system and computer program to extract viewpoint and illumination invariant keypoints in scale-space with a particular configuration that shows better precision vs. recall results than SIFT and SURF is disclosed. The program is run on a computer, a digital signal processor, a field-programmable gate array, an application-specific integrated circuit, a micro-processor, a micro-controller, or any other form of programmable hardware.

Although the present invention has been described with reference to specific embodiments, it should be understood by those skilled in the art that the foregoing and various other changes, omissions and additions in the form and detail thereof may be made therein without departing from the spirit and scope of the invention as defined by the following claims.

The invention claimed is:

1. A method of keypoint scale-space extraction and description in an image, the method comprising the steps of:
   a) filtering the image with triangle kernel filters at different scales;
   b) computing an approximation of a determinant of Hessian at each scale, the approximation at each scale k being calculated as $|\partial^k_{xx}(i,j) \cdot \partial^k_{yy}(i,j) - \partial^k_{xy}(i,j)^2|$ where $\partial_{xx}$ is a second horizontal derivative of Gaussian over a filtered image response L(k, i, i) obtained in step a) at scale k at point (i, j), $\partial_{yy}$ is a second vertical derivative of Gaussian over the filtered image response L(k, i, j), and $\partial_{xy}$ is the cross derivative of Gaussian over the filtered image response L(k, i, j), using a first design parameter $d_1$ for computing a second horizontal and vertical derivatives of Gaussian, $\partial_{xx}$ and $\partial_{yy}$, and a second design parameter $d_2$ for computing a cross derivative of Gaussian $\partial_{xy}$, being both the first design parameter $d_1$ and the second design parameter $d_2$ proportional to a deviation $\sigma$ of a second derivative of Gaussian kernel;
   c) searching for extremum values both within a single scale and along the scale space of the approximation of the determinant of Hessian obtained in step b) and calculating the keypoints from these extrema values;
   d) for each keypoint, localized at an extremum value, detecting the dominant orientations from gradient information calculated using the filtered image response obtained in step a); and
   e) calculating for each dominant orientation a keypoint descriptor.

2. The method of claim 1, wherein the step of detecting the dominant orientations comprises the following steps:
   for each keypoint, a number of samples inside a neighborhood of the keypoint are selected,
   for each sample (i, j), a horizontal gradient is calculated as $\partial^k_x = L(k, i-d_3, j) - L(k, i+d_3, j)$ and a vertical gradient is calculated as $\partial^k_y = L(k, i, j-d_3) - L(k, i, j+d_3)$
   where L(k, i, j) is the filtered image response obtained in step a) at scale k at point (i, j) and $d_3$ is a design parameter,
   each gradient is accumulated into a histogram with a weight proportional to its magnitude and with a Gaussian kernel centered at the keypoint,
   the dominant orientations are found by searching for peaks with values near the maximum.

3. The method of claim 2, wherein the neighborhood is a circular neighborhood.

4. The method of claim 1, wherein the descriptor is composed of oriented gradients sampled with a specific layout, where the oriented gradients are calculated
   where L(k, i, j) is the filtered image response obtained in step a) at scale k at point (i, j) and $d_3$ is a design parameter, and θ is the angle of the dominant orientation of the keypoint.

5. The method of claim 4, wherein the layout consists of a number of segments and rings, each segment is a portion of the neighborhood of the keypoint and each ring is a group of segments that share the following property: the center of the segment is placed at the same Euclidean distance from the keypoint.

6. The method of claim 1, where the calculation of the keypoint is done with sub-pixel and sub-scale accuracy.

7. The method of claim 6, wherein the calculation of the keypoints is done fitting a quadratic function centered in each extremum value to determine the interpolated location and searching in the neighboring pixels of the same scale, the upper and the lower ones.

8. The method of claim 1, wherein the filters are 2D triangle shaped filters.

9. The method of claim 1, where $d_1$ and $d_2$ are proportional to the σ (sigma) of the approximated second derivative of Gaussian kernel.

10. A system comprising:
    a processor, the processor executing a program code adapted to perform a method of keypoint scale-space extraction and description in an image, the method comprising the steps of
    a) filtering the image with triangle kernel filters at different scales;
    b) computing an approximation of a determinant of Hessian at each scale, the approximation at each scale k being calculated as $|\partial^k_{xx}(i,j) \cdot \partial^k_{yy}(i,j) - \partial^k_{xy}(i,j)^2|$ where $\theta_{xx}$ is a second horizontal derivative of Gaussian over a filtered image response L(k, i, j) obtained in step) a) at scale k at point (i, j), $\partial_{yy}$ is a second vertical derivative of Gaussian over the filtered image response L(k, i, j), and $\partial_{xy}$ is the cross derivative of Gaussian over the filtered image response L(k, i, j), using a first design parameter $d_1$ for computing a second horizontal and vertical derivatives of Gaussian, $\partial_{xx}$ and $\partial_{yy}$, and a second design parameter $d_2$ for computing a cross derivative of Gaussian $\partial_{xy}$, being both the first design parameter $d_1$ and the second design parameters $d_2$ proportional to a deviation σ of a second derivative of Gaussian kernel;
    c) searching for extremum values both within a single scale and along the scale space of the approximation of the determinant of Hessian obtained in step b) and calculating the keypoints from these extrema values;
    d) for each keypoint, localized at an extremum value, detecting the dominant orientations from gradient information calculated using the filtered image response obtained in step a); and
    e) calculating for each dominant orientation a keypoint descriptor.

11. The system of claim 10, wherein the step of detecting the dominant orientations comprises the following steps:
    for each keypoint, a number of samples inside a neighborhood of the keypoint are selected,
    for each sample (i, j), a horizontal gradient is calculated as $\theta^k_x = L(k, i-d_3, j) - L(k, i+d_3, j)$ and a vertical gradient is calculated as $\partial^k_y = L(k, i, j-d_3) - L(k, i, j+d_3)$
    where L(k, i, j) is the filtered image response obtained in step a) at scale k at point (i, j) and $d_3$ is a design parameter,
    each gradient is accumulated into a histogram with a weight proportional to its magnitude and with a Gaussian kernel centered at the keypoint,
    the dominant orientations are found by searching for peaks with values near the maximum.

12. The system of claim 10, wherein the descriptor is composed of oriented gradients sampled with a specific layout, where the oriented gradients are calculated where $L(k, i, j)$ is the filtered image response obtained in step a) at scale k at point $(i, j)$ and $d_3$ is a design parameter, and $\theta$ is the angle of the dominant orientation of the keypoint.

13. The system of claim 10, where the calculation of the keypoint is done with sub-pixel and sub-scale accuracy.

14. The system of claim 13, wherein the calculation of the keypoints is done by fitting a quadratic function centered in each extremum value to determine the interpolated location and searching in the neighboring pixels of the same scale, the upper and the lower ones.

15. The system of claim 10, wherein the filters are 2D triangle shaped filters.

16. A non-transitory computer readable medium storing a program code which, when executed by a processor, is adapted to a method of keypoint scale-space extraction and description in an image, the method comprising the steps of
   a) filtering the image with triangle kernel filters at different scales;
   b) computing an approximation of a determinant of Hessian at each scale, the approximation at each scale k being calculated as $|\partial^k_{xx}(i,j) \cdot \partial^k_{yy}(i,j) - \partial^k_{xy}(i,j)^2|$, where $\partial_{xx}$ is a second horizontal derivative of Gaussian over a filtered image response $L(k, i, j)$ obtained in step a) at scale at point $(i, j)$, $\partial_{yy}$ is a second vertical derivative of Gaussian over the filtered image response $L(k, i, j)$, and $\partial_{xy}$ is the cross derivative of Gaussian over the filtered image response $L(k, i, j)$, using a first design parameter $d_1$ for computing a second horizontal and vertical derivatives of Gaussian, $\partial_{xx}$ and $\partial_{yy}$, and a second design parameter $d_2$ for computing a cross derivative of Gaussian $\partial_{xy}$, being both the first design parameter $d_1$ and the second design parameters $d_2$ proportional to a deviation $\sigma$ of a second derivative of Gaussian kernel;
   c) searching for extremum values both within a single scale and along the scale space of the approximation of the determinant of Hessian obtained in step b) and calculating the keypoints from these extrema values;
   d) for each keypoint, localized at an extremum value, detecting the dominant orientations from gradient information calculated using the filtered image response obtained in step a); and
   e) calculating for each dominant orientation a keypoint descriptor.

17. The medium of claim 16, wherein the step of detecting the dominant orientations comprises the following steps:
   for each keypoint, a number of samples inside a neighborhood of the keypoint are selected,
   for each sample $(i, j)$, a horizontal gradient is calculated as $\partial^k_x = L(k, i-d_3, j) - L(k, i+d_3, j)$ and a vertical gradient is calculated as $\partial^k_y = L(k, i, j-d_3) - L(k, i, j+d_3)$
   where $L(k, i, j)$ is the filtered image response obtained in step a) at scale k at point $(i, j)$ and $d_3$ is a design parameter,
   each gradient is accumulated into a histogram with a weight proportional to its magnitude and with a Gaussian kernel centered at the keypoint,
   the dominant orientations are found by searching for peaks with values near the maximum.

18. The medium of claim 16, wherein the descriptor is composed of oriented gradients sampled with a specific layout, where the oriented gradients are calculated where $L(k, i, j)$ is the filtered image response obtained in step a) at scale k at point $(i, j)$ and $d_3$ is a design parameter, and $\theta$ is the angle of the dominant orientation of the keypoint.

19. The medium of claim 16, where the calculation of the keypoint is done with sub-pixel and sub-scale accuracy.

20. The medium of claim 19, wherein the calculation of the keypoints is done by fitting a quadratic function centered in each extremum value to determine the interpolated location and searching in the neighboring pixels of the same scale, the upper and the lower ones.

* * * * *